United States Patent [19]

Stoll

[11] Patent Number: 4,483,641
[45] Date of Patent: Nov. 20, 1984

[54] WASTE DISPOSAL LANDFILL

[76] Inventor: Ulrich W. Stoll, 2121 Hall, Ann Arbor, Mich. 48104

[21] Appl. No.: 461,338

[22] Filed: Jan. 27, 1983

[51] Int. Cl.³ .............................................. B09B 1/00
[52] U.S. Cl. ..................................... 405/129; 405/53; 405/36
[58] Field of Search .................. 405/36, 53, 128, 129, 405/131, 258; 210/170

[56] References Cited

U.S. PATENT DOCUMENTS 3,501,917  3/1970  Detter .................................. 405/53
3,791,443  2/1974  Burt et al. ....................... 405/131 X
4,358,221  11/1982 Wickberg ............................ 405/28
4,430,021  2/1984  Wagner et al. .................... 405/129

Primary Examiner—David H. Corbin
Attorney, Agent, or Firm—Stephenson and Boller

[57] ABSTRACT

A waste disposal landfill comprises a layer of porous material such as stone or crushed concrete applied over the waste before the final cover. Conduits extend from the layer through the cover to atmosphere and terminate in self-aligning airscoops. Ventilation through the porous layer occurs in response to ambient winds to remove water from the landfill especially that intercepted and temporarily retained by the porous layer and thus inhibit leachate formation.

20 Claims, 9 Drawing Figures

WASTE DISPOSAL LANDFILL

BACKGROUND AND SUMMARY OF THE INVENTION

This invention relates generally to waste disposal landfills and is particularly concerned with abatement of leachate formation in a waste disposal landfill. More specifically, leachate abatement is accomplished by a ventilation layer with means to induce airflow through the ventilation layer so as to evaporate water which may have intruded into the landfill and to remove the water from the landfill.

There exists substantial concerns about the possibility and potential adverse consequences of long-term leachate formation within hazardous waste disposal landfills. Indeed, governmental regulations have recently mandated positive means for inhibiting formation of and removing leachate from hazardous waste disposal landfills during their active lives. For example, sloping the bottom liner of the landfill, providing a collection drainage blanket and collection pipe, and specific treatment of leachate are mandated.

Notwithstanding stringent requirements for both the bottom liner to preclude exfiltration of any residual leachate and providing a highly impermeable and properly sloped cover for the landfill, there is still concern that some small portion of the local precipitation will find its way through the final cover and over a period of time generate appreciable leachate which in turn may escape the landfill. If nothing else, slowly accumulating leachate could fill and ultimately spill from the landfill (so called bathtub effect).

The currently specified remedy for this is to periodically pump such leachate as may accumulate from the collection system for an indefinite period of time. This is both expensive and bothersome, and there will be the temptation to delay pumping until a "worthwhile" amount of leachate has accumulated. This will increase the risk that some of the leachate will exfiltrate in an uncontrolled and undefined amount.

The present invention is directed to providing a new and improved waste disposal landfill with a particular improvement in abating leachate formation. Through such abatement, the concerns expressed above will be substantially lessened, if not entirely eliminated. In addition to its objective attributes in minimizing or eliminating leachate formation, the invention possesses the advantage of being a purely mechanical system comprised of relatively inexpensive, proven, and readily available materials and apparatus. Moreover, it can be easily inspected and repaired if necessary. It is also redundant and can be modified without the necessity of exposing the in situ waste. The system can be installed to supplement the final cover of a waste disposal landfill over a wide range of suspect or uncontrolled hazardous wastefills thereby to provide assured long-term abatement of surface infiltration and consequent leachate generation and possible migration from the landfill.

The invention arises in part through applicant's recognition that at most, if not all, current or potentially available landfill sites, certain natural conditions or circumstances prevail which can be used to advantage in substantially minimizing or entirely eliminating leachate formation. Included among these conditions and circumstances are the following: (A) generally less than one inch of annual rainfall is likely to infiltrate through a proper final cover of a waste disposal landfill; (B) there are extended periods of time during which the ambient atmospheric relative humidity is below 100%; (C) during a preponderance of the year, the dew point temperature of ambient air is well below that of the prevailing temperature in the upper portion of the waste landfill (i.e. immediately below the final clay cover); and (D) during a preponderance of the year there are appreciable natural wind currents.

Recognizing and utilizing these naturally occurring environmental phenomena, applicant has invented a waste disposal landfill in which the ambient relatively dry atmospheric air (relative humidity less than 100%) is forced by natural wind forces through a porous ventilating layer interposed between the top of the waste and the underside of the final cover. The ventilating layer will intercept and temporarily retain the limited volumes of moisture which may percolate from the overlying cover. The concomitant air movement through the layer will tend to evaporate, convey and remove any free moisture which it encounters as well as to diffuse through and thereby reduce the overall humidity of air which it may encounter in the layer.

In one embodiment of the invention, air enters through intake pipes located at the periphery of the covered landfill and exits from one or more centrally located exhaust pipes. Both are provided with self-aligning airscoops. Intake pipes are provided with self-aligning airscoops to face upwind and to provide a partial positive pressure; exhaust pipes with an analogous self-aligning airscoop facing downwind to provide a partial negative pressure, thereby to facilitate movement of ambient air through the ventilating blanket layer. The number and location of pipes are chosen to provide adequate ventilation below the entire area of the final cover.

It is possible to utilize the invention with either a fully enclosed landfill (i.e., one having an impervious bottom liner) or a partially enclosed landfill (i.e. without impervious bottom). In the latter case, a wick and blanket capillary system may be used to provide a blanket portion coextensive with the ventilation layer and with a wick portion extending through the waste material to a level below that of the prevailing water table. The capillary action will be effective to induce a capillary flow of any accumulated water upwardly within the landfill to the ventilating layer where it is removed in the manner explained above. With the partially enclosed landfill being in hydraulic communication with the surrounding water table, the capillary action creates a hydraulic gradient from the water table toward the interior of the reservoir so as to thereby impede the recharge of ground water which is being removed from below the waste deposit. The rate is sufficient to maintain the interior free water level below that of the surrounding water table and the hydraulic gradient thus created inhibits the outward excursion of leachate which might otherwise occur.

Several embodiments of the invention are disclosed herein in order to illustrate its principles.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF PREFERRED EMBODIMENT

Figure 1:
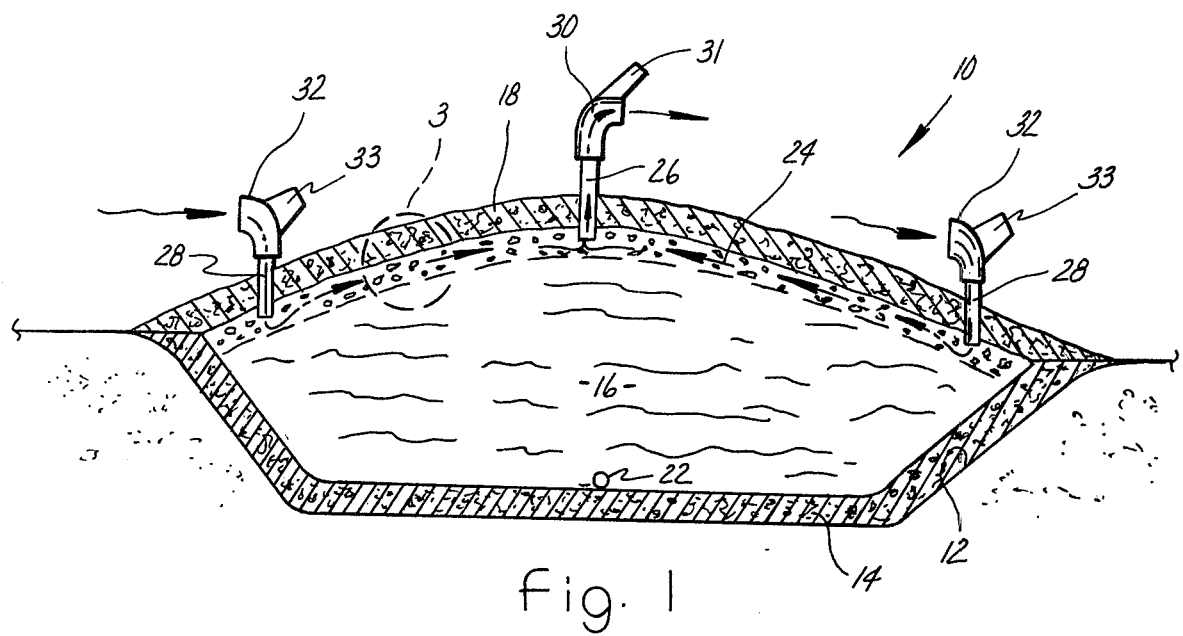
FIG. 1 is a vertical sectional view through a central region of a waste disposal landfill embodying principles of the present invention and is taken substantially in the direction of arrows 1—1 in FIG. 2.
Figure 2:
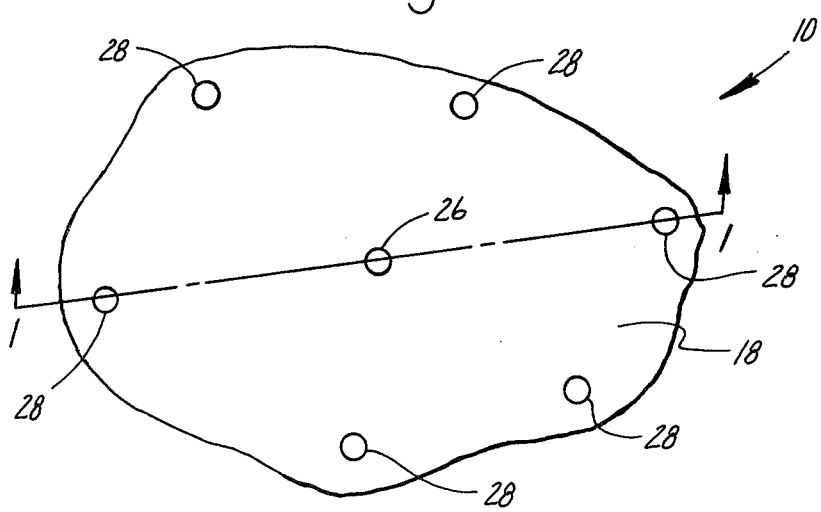
FIG. 2 is a plan view of the landfill of FIG. 1.
Figure 3:
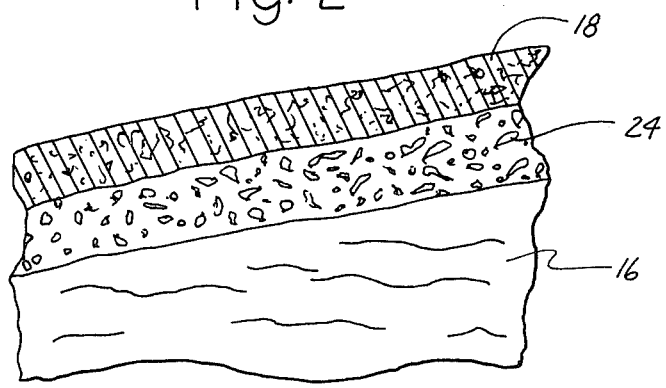
FIG. 3 is an enlarged fragmentary view taken within circle 3 in FIG. 1.

FIGS. 1, 2 and 3 illustrate a first embodiment of waste disposal landfill 10 embodying principles of the present invention. The landfill comprises an in-ground reservoir 12. Where the existing soil conditions are such that the soil is not effective to contain waste material within the reservoir without leaching, an impervious bottom liner 14 of suitable material, typically clay or highly impermeable plastic membrane(s), is used to line the reservoir. The reservoir is then filled with the waste material 16.

In accordance with prior constructions, the landfill, after having been filled with waste material, is then closed, or capped, by a final cover 18 which is highly impermeable to water and leachate, for example clay. Preferably, the landfill cover is shaped with a central crown so that natural drainage carries precipitation outwardly beyond the perimeter of the reservoir.

The prior constructions also typically included a collection pipe 22 at the bottom of the reservoir for collecting leachate. The collection pipe was typically associated with pumping mechanism (not shown) which would pump the collected leachate from the reservoir so that outflow and overflow would be avoided. This prior construction, however, was susceptible to the disadvantages enumerated earlier.

In accordance with principles of the present invention, a ventilation layer 24 is included in the construction of the landfill. The ventilation layer comprises accessible air passages (i.e., the layer is porous), and appreciable surface area to intercept and temporarily hold infiltrating moisture. The preferred construction contemplates the use of larger sized uniform graded stone or crushed concrete as the material forming the layer. The layer is applied after the reservoir has been filled to a suitable level with the waste material 16. Crowning remains a preferred constructional technique, although it will be recognized that crowning is not essential to practice of the principles of the invention in its broadest aspect. The ventilation layer has air spaces forming air passages throughout, and the size of the stone and/or crushed concrete is selected so as to provide approximately 30% to 50% air space of the total overall volume occupied by the layer. After the ventilation layer has been formed, then the closing cover is applied. In this way, the ventilation layer provides subjacent support for the clay cover 18.

Ventilating airflow is created throughout the ventilation layer by means of a ventilation system which in the preferred embodiment comprises a plurality of vent pipes, or conduits, communicating the ventilation layer to atmosphere. The illustrated embodiment 10 comprises a central ventilation conduit 26 and six ventilation conduits 28 at locations around the margin of the perimeter. The drawing figure is merely illustrative of principles of the invention and is not to any particular scale. Each of the ventilation conduits comprises a self-aligning airscoop at its point of communication to atmosphere. The airscoops are of conventional design capable of freely revolving about the corresponding vertical pipe to face either upwind or downwind as will be explained. For central conduit 26, the self-aligning airscoop is designated by the reference numeral 30 while the reference numeral 32 designates the self-aligning airscoops for the outer conduits 28.

The drawing illustrates the conduits 26, 28 as being vertically disposed. The lower ends of the conduits terminate within the ventilation layer, for example about halfway through its thickness.

The self-aligning airscoops are illustrated as 90° elbows having openings disposed in generally vertical planes so as to face horizontally. The airscoop 30 is configured with a vane 31 so that its opening to atmosphere faces downwind while each of the self-aligning airscoops 32 is configured with a vane 33 to face upwind.

This construction results in the creation of pressure differentials in the ventilation layer between conduit 26 and conduits 28 giving rise to flow in the ventilation layer. Ambient air entering one of the airscoops 32 around the perimeter is conducted through the corresponding ventilation conduit 28 and through a path in the ventilation layer to the central conduit 26. This air will at most times have a relative humidity of less than 100%. In passing through the ventilation layer, air will tend to pick up water vapor present in the ventilation layer and to promote the evaporation of any liquid water present especially from the surfaces of the ventilating layer or underside of the clay cover. The moisture is carried by the air through the central conduit 26 to exhaust to atmosphere via the central air scoop 30.

It can thus be perceived that the invention makes accessible and utilizes the induced natural convection flow of ambient air through the ventilation layer in response to any direction of ambient wind so that moisture is thereby removed from the landfill and a tendancy toward evaporation of water is created within the landfill.

The invention can preclude the need for a collection pipe and pumping system to remove accumulated leachate at the bottom. However, the invention may be used with or without that or any other additional type of system.

It can be perceived that the invention is advantageous in that it is entirely a passive system, constructed from existing readily available and inherently durable devices and materials. The stone or crushed concrete layer is a readily available material and can be readily applied to cover the waste in the reservoir. It maintains suitable air voids for the flow of air and will intercept and temporarily retain percolating surface moisture and it provides subjacent support for the clay cover. The ventilation pipes and self-aligning airscoops are also conventional, readily available and relatively inexpensive devices.

It will also be noted that the ventilation structure is contained entirely above the level of the waste material and, hence, inspection and repair, if necessary, can be readily accomplished without having to expose the waste. Moreover, the system can be added to or subtracted from without having to expose the waste. Because it is entirely passive, operating through the natural phenomena referred to above, the invention is extremely efficient both in construction and in use and it is entirely compatible with the surrounding environment.

During certain times under certain ambient conditions (high relative humidity, absence of wind, etc.) the system will be relatively inactive. However, prevailing climatological conditions over time will give rise to a preponderance of favorable factors adequate to provide a sufficient level of average airflow to prevent water which may intrude into the landfill from percolating through the waste material to where it may collect and escape the enclosure. The exact sizes, locations, etc. and numbers of ventilating elements can be determined from engineering calculations and/or emperically and with reference to available ambient environmental data. Hence, the drawings are illustrated on an arbitrary scale and are merely to intend to disclose the principles of the invention. Other configurations may also be used to advantage.

Figure 4:
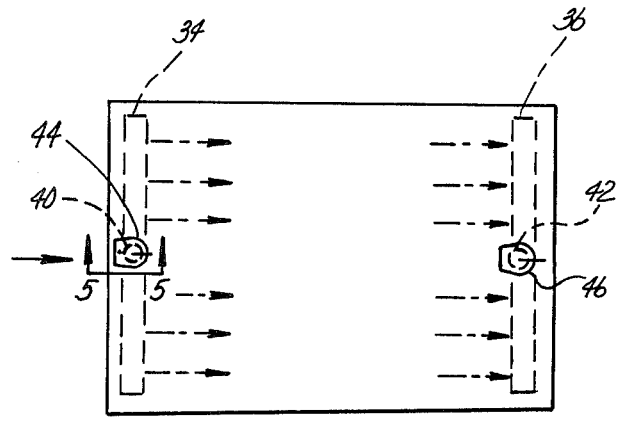
FIG. 4 is a plan view similar to FIG. 2 illustrating another configuration of landfill.
Figure 5:
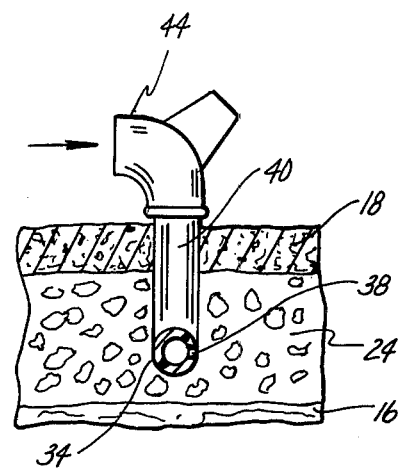
FIG. 5 is an enlarged fragmentary vertical sectional view taken in the direction of arrows 5—5 in FIG. 4.

One such configuration is illustrated in FIGS. 4 and 5. Arbitrarily a rectangular shape landfill is shown in which a pair of distribution conduits 34 and 36, respectively, are shown extending horizontally along opposite sides of the facility. These distribution conduits are disposed parallel within the ventilating layer and extend lengthwise within the ventilating layer throughout their full length. Each contains a series of spaced apart apertures 38 which face those of the opposite conduit in the installed position. Also in communication with each distribution conduit 34, 36 is a corresponding communication conduit 40, 42, respectively, which extends vertically upwardly from a central region of the corresponding distribution conduit 34, 36 to atmosphere. The conduit passes through the clay cover 18 and on the exterior portion is provided with a self-aligning airscoop 44, 46. The construction of the airscoop 44 is such as to face upwind while the airscoop 46 is constructed to face downwind. The air flow in response to a prevailing wind is such that air enters the airscoop 44 passes through the conduit 40 to the distribution conduit 34. From there, air passes through the apertures 38 of conduit 34 into the ventilation layer. It passes across the ventilation layer to enter the apertures 38 of distribution conduit 36 and from there passes upwardly through conduit 42 to be discharged via airscoop 46.

Figure 6:
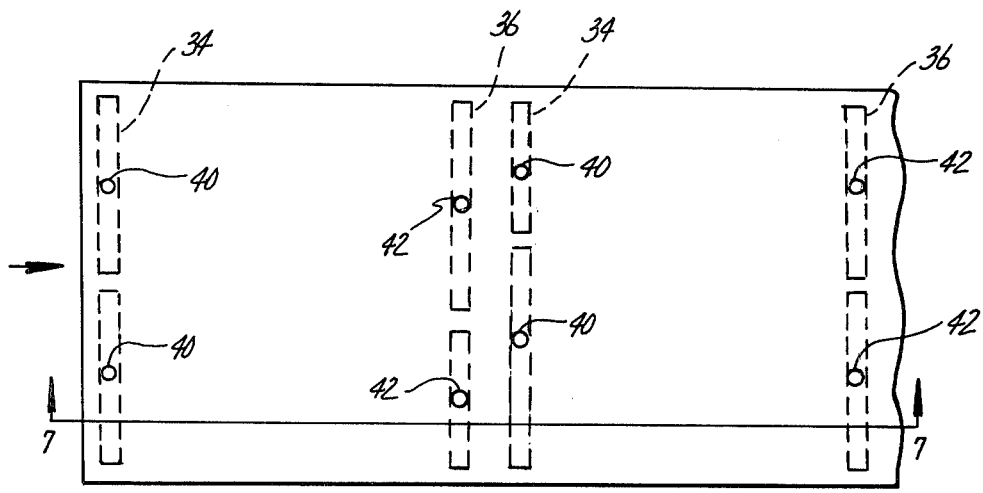
FIG. 6 is a plan view similar to FIG. 4 illustrating a further configuration of landfill.
Figure 7:
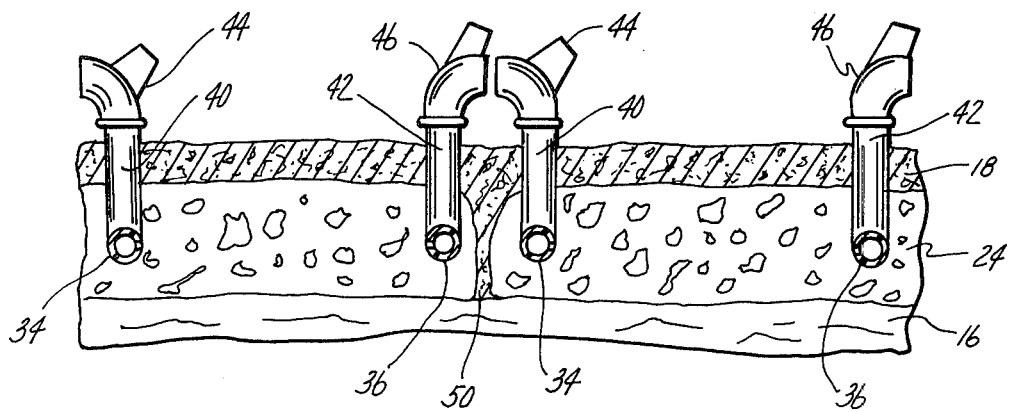
FIG. 7 is a view taken substantially in the direction of arrows 7—7 in FIG. 6 and with portions on an enlarged scale.

FIGS. 6 and 7 illustrate yet another configuration in which multiple vertical conduits 40 are associated with each distribution conduit 34 and multiple conduits 42 which each distribution conduit 36. The pattern is such that the conduits 42 are offset from the conduits 40 in the direction lengthwise of the conduits 34, 36. The pattern of FIG. 6 illustrates a landfill containing a repeat pattern of ventilating layer constructions. The repeat patterns are separated by a clay cutoff 50. Once again, the scale is entirely arbitrary in the drawings since they are intended to illustrate general principles of the invention. Moreover, the number of repeat patterns is also arbitrary.

The other details of the construction and operation of the FIGS. 6 and 7 configuration correspond to details described in connection with the configuration of FIGS. 4 and 5.

Figure 8:
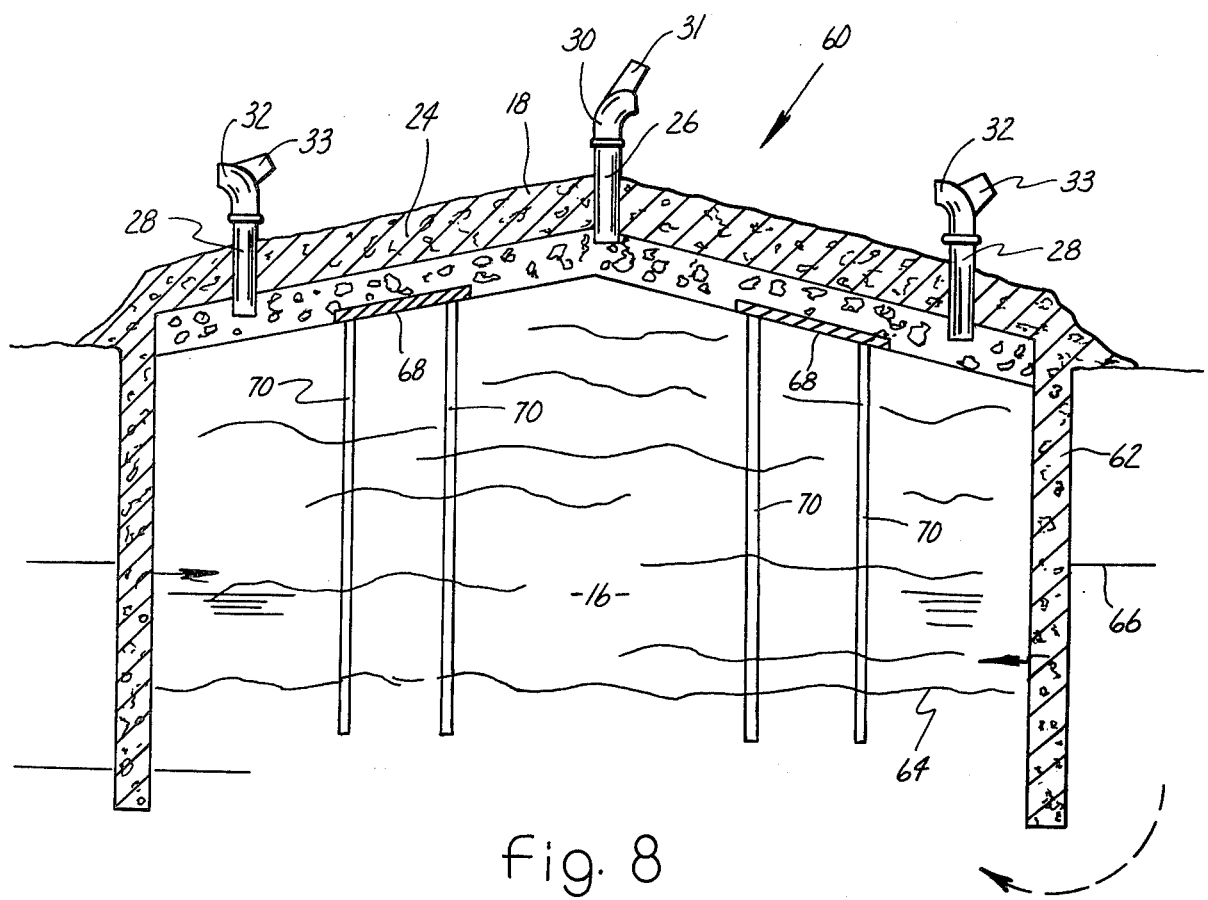
FIG. 8 is a vertical sectional view similar to FIG. 1 illustrating another example of landfill embodying principles of the invention.

FIG. 8 illustrates a further embodiment of landfill 60 which differs from the first embodiment of FIGS. 1-3 in that instead of the reservoir being fully lined by an impervious bottom liner, it comprises a circumferential vertical barrier 62 within which the waste material is contained. In this embodiment, the waste material may extend downwardly to a level 64 which is below that of the prevailing ground water table level 66. As such, the reservoir is only partially enclosed and is in hydraulic subterranean communication with the existing water table. In this embodiment, means are provided to impede recharging by the existing aquifer of the water removed from the waste reservoir such that an inward hydraulic gradient is consistently maintained which is effective to prevent outward excursion of contaminated waters which may have been in contact with the waste (i.e. leachate).

Figure 9:
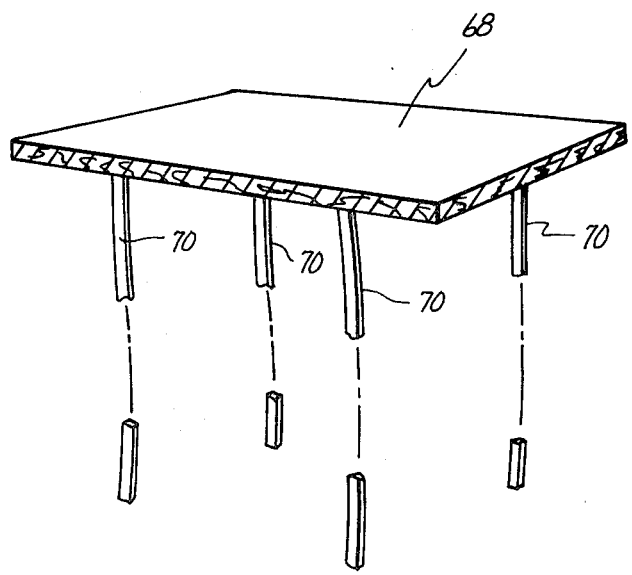
FIG. 9 is a perspective view illustrating a portion of the construction of the embodiment of FIG. 8.

The means for doing this is illustrated by itself in FIG. 9 and comprises a capillary blanket and wick construction. The blanket portion 68 is disposed at the ventilating layer. The wicks 70 extend from the blanket downwardly through the waste to a level below that of the water table 66. This structure creates by capillary action an upward movement of water through the waste which gives rise to the inward hydraulic gradient referred to above. The upward flow of moisture is promoted through the operation of the ventilation layer in the manner described above for the preceding embodiments. The blanket and wick structure may be any suitable material such as synthetic fiber mat and strips. Once again, the details of construction will depend upon the various parameters existing at the site and can be calculated on the basis of engineering computations and/or empirically determined.

While a preferred embodiment has been disclosed, it will be appreciated that principles of the invention are applicable to other embodiments.

What is claimed is:

1. In a waste disposal landfill having an inground reservoir, waste within said reservoir, and a cover for said reservoir, the improvement which comprises a ventilation layer disposed between the cover and the waste including means to provide subjacent support of the cover and to intercept and temporarily retain moisture percolating through the cover, and containing air passages throughout, and means for ventilating said layer to exterior of the covered reservoir.

2. The improvement set forth in claim 1 in which said ventilation layer comprises a material which is selected from the group consisting of stone and crushed concrete.

3. The improvement set forth in claim 2 wherein the material of said ventilation layer provides air passages constituting approximately 30% to 50% by volume of the total volume of said layer.

4. The improvement set forth in claim 2 wherein the material is selected to intercept and temporarily retain moisture percolating through the cover.

5. The improvement set forth in claim 1 in which said means for ventilating said layer comprises means for inducing external convection air to flow through the air passages of said layer.

6. The improvement set forth in claim 1 in which said means for ventilating said layer comprises means communicating said layer to atmosphere and for inducing atmospheric air to flow through the air passages of said layer.

7. The improvement set forth in claim 1 in which said means for ventilating said layer comprises ventilation conduits communicating said ventilation layer with atmosphere and self-aligning airscoops on said conduits at their points of communication to atmosphere.

8. The improvement set forth in claim 7 in which said ventilation conduits extend through said cover.

9. The improvement set forth in claim 8 in which one of said conduits is disposed generally centrally of the perimeter of the reservoir and additional ones of said conduits are disposed radially outwardly of said one central conduit toward the perimeter of the reservoir.

10. The improvement set forth in claim 9 in which the cover is crown-shaped with said one central conduit projecting through the cover in the vicinity of the peak of the crown and with said additional ones of said conduits projecting through the cover around the margin of the perimeter of the cover.

11. The improvement set forth in claim 7 in which said means for ventilating said layer comprises a distribution conduit section disposed within the ventilation layer to extend lengthwise along the margin of a portion of the perimeter of said layer, apertures at intervals along the length of said distribution conduit to communicate the interior of the distribution conduit to the air passages of said layer and a communication conduit section in communication with said distribution conduit section and extending from said distribution conduit section to atmosphere, one of said self-aligning airscoops being on said communication conduit section at the point of its communication to atmosphere.

12. The improvement set forth in claim 6 in which said means for ventilating said layer comprises a distribution conduit section disposed within the ventilation layer to extend lengthwise along a portion of the margin of the perimeter of said layer, a second distribution conduit section disposed within the ventilation layer to extend lengthwise along a portion of said layer generally parallel to said first distribution conduit section, apertures along the length of each of said distribution conduit sections to establish communication between the respective distribution conduit section and the air passages of said ventilation layer, a communication conduit section communicating the first distribution conduit section at atmosphere and a second communication conduit section communicating the second distribution conduit section to atmosphere, self-aligning air scoops on each of said communication conduit sections at their respective points of communication to atmosphere, said self-aligning air scoops being effective to cause one airscoop to face in the upwind direction and the other to face in the downwind direction.

13. The improvement set forth in claim 5 in which said means for ventilating said layer comprises a distribution conduit section disposed within said ventilation layer to extend lengthwise generally horizontally within the layer, a second distribution conduit section disposed within said ventilation layer to extend lengthwise generally horizontally within the layer and being spaced from and generally parallel to, said first distribution conduit section, apertures in said distribution conduit sections for establishing communication of the respective distribution conduit section with the air passages of the ventilation layer, a communication conduit section communicating the first distribution conduit section to atmosphere, a second communication conduit section communicating the second distribution conduit section to atmosphere, said two communication conduit sections being offset relative to each other along the respective lengths of the two distribution conduit sections.

14. The improvement set forth in claim 1 in which the reservoir comprises a impervious liner forming the bottom of the reservoir, said cover being substantially sealed around its margin with respect to the perimeter of the impervious liner.

15. The improvement set forth in claim 14 in which said liner and said cover are clay.

16. The improvement set forth in claim 1 in which the bottom of the reservoir is disposed below the prevailing water table level with subterranean hydraulic communication existing between the reservoir and the surrounding water table, and including means to create a hydraulic gradient inwardly of the reservoir to preclude the excursion of waste leachate from the reservoir to the surrounding water table.

17. The improvement set forth in claim 16 including means to induce an upward capillary flow of water at the bottom of the reservoir through the waste to the ventilation layer.

18. The improvement set forth in claim 17 wherein said means to induce upward capillary flow of water to the ventilation layer comprises wick and blanket structure with the blanket portion disposed at the ventilating layer and the wick portion extending from the blanket portion through the waste to a level below that of the surrounding water table.

19. In a waste disposal landfill having an inground reservoir, waste within said reservoir and a cover for said reservoir, the improvement which comprises a ventilation layer overlying the waste within the reservoir and containing air passages throughout, and means for inducing airflow through the ventilation layer to remove water from within the landfill.

20. In the method of constructing a waste disposal landfill in which waste is disposed in an inground reservoir and covered by a ground cover, the improvement for inhibiting excursion of waste leachate from the landfill which comprises covering the waste with a layer of porous material before the ground cover is is applied and inducing ventilating air flow through the porous material after the ground cover has been applied to remove water from within the landfill.

* * * * *